United States Patent [19]

Yost

[11] Patent Number: 4,740,317
[45] Date of Patent: Apr. 26, 1988

[54] PUMP FILTER APPARATUS AND METHOD

[76] Inventor: Ken Yost, 8146 Chipwood Way, Orangevale, Calif. 95662

[21] Appl. No.: 45,365

[22] Filed: May 1, 1987

[51] Int. Cl.$^4$ ............................................. B01D 35/02
[52] U.S. Cl. .................................. 210/798; 210/196; 210/411; 210/435
[58] Field of Search .............. 210/797, 798, 171, 196, 210/409, 411, 416.1, 416.5, 427, 435, 446, 449, 451, 425, 429–432; 134/104

[56] References Cited

U.S. PATENT DOCUMENTS

| | | |
|---|---|---|
| 748,821 | 1/1904 | Wackerow ............................ 210/411 |
| 2,658,622 | 11/1953 | Thornhill ............................ 210/409 |
| 3,184,973 | 5/1965 | Bradley . |
| 3,246,749 | 4/1966 | Moser . |
| 3,414,129 | 12/1968 | Going et al. ....................... 210/411 |
| 3,425,078 | 2/1969 | Lazaga . |
| 3,520,643 | 7/1970 | Busse et al. . |
| 3,540,073 | 11/1970 | Issenmann . |
| 3,545,011 | 12/1970 | Helke et al. . |
| 3,811,571 | 5/1974 | Woods et al. . |
| 3,837,497 | 9/1974 | Smith . |
| 3,996,136 | 12/1976 | Jakubek et al. . |
| 4,092,248 | 5/1978 | Lamb . |
| 4,161,448 | 7/1979 | Erickson et al. . |
| 4,264,446 | 4/1981 | Fregeau ............................ 210/446 |
| 4,388,968 | 6/1983 | Brandell . |
| 4,543,114 | 9/1985 | Beattie et al. ...................... 210/446 |
| 4,637,825 | 1/1987 | Howeth ............................... 55/497 |
| 4,678,589 | 7/1987 | Ayres, Jr. .......................... 210/409 |
| 4,681,609 | 7/1987 | Howeth ............................... 55/302 |

Primary Examiner—Richard V. Fisher
Assistant Examiner—Richard D. Jordan
Attorney, Agent, or Firm—Limbach, Limbach & Sutton

[57] ABSTRACT

The present invention provides an apparatus and method for the separation of solids entrained in fluid streams. The apparatus consists of a pipecross-like chamber which is divided into two regions by a perforated deflector/separator plate angularly disposed within the chamber. A shear jet is disposed perpendicular to the flow path and higher pressure fluid is thereby injected into the chamber to deflect and separate entrained solids. In preferred embodiments the apparatus and method are used to protect a centrifugal pump impeller from damage by the solids. While conventional pipe joints and parts can be used, an alternate embodiment provides removable side plates and a removable deflector/separator plate for ease of installation and maintenance.

13 Claims, 3 Drawing Sheets

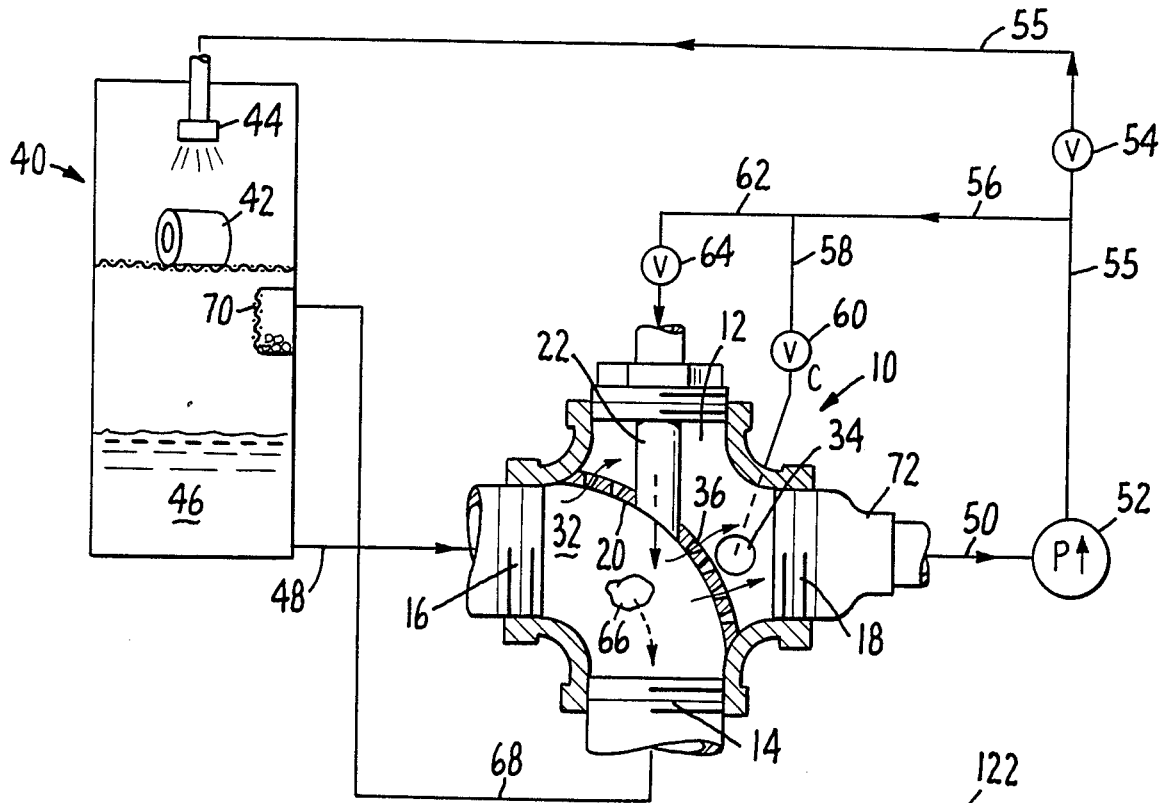
FIG.4.
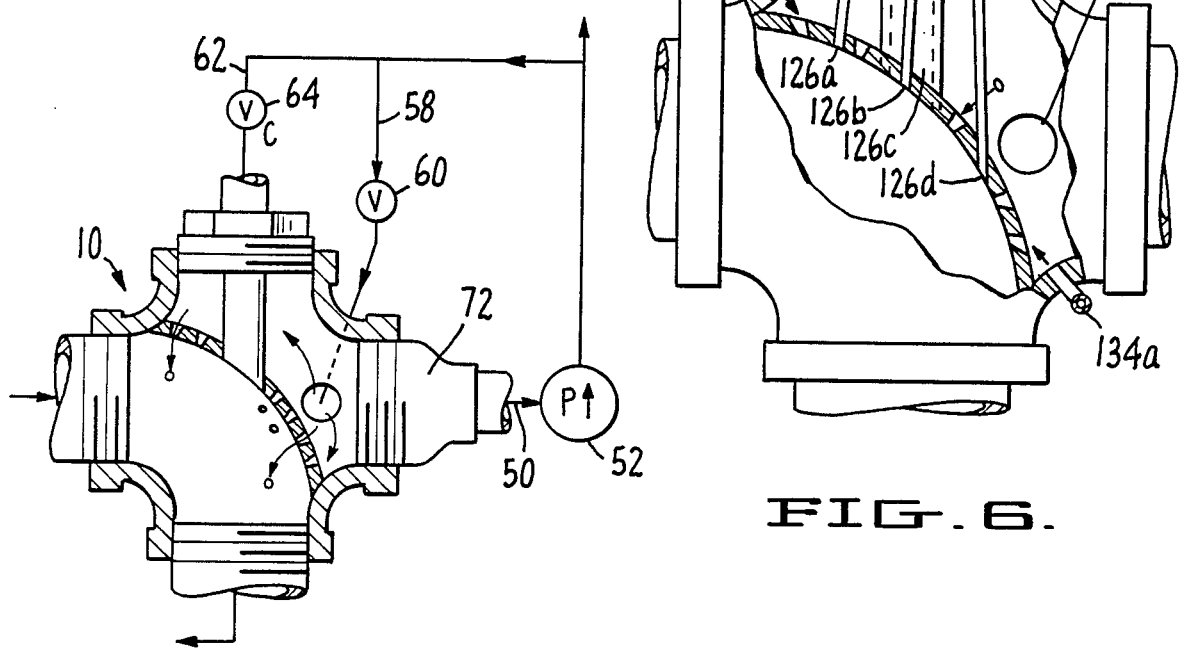
FIG.5.
FIG.6.

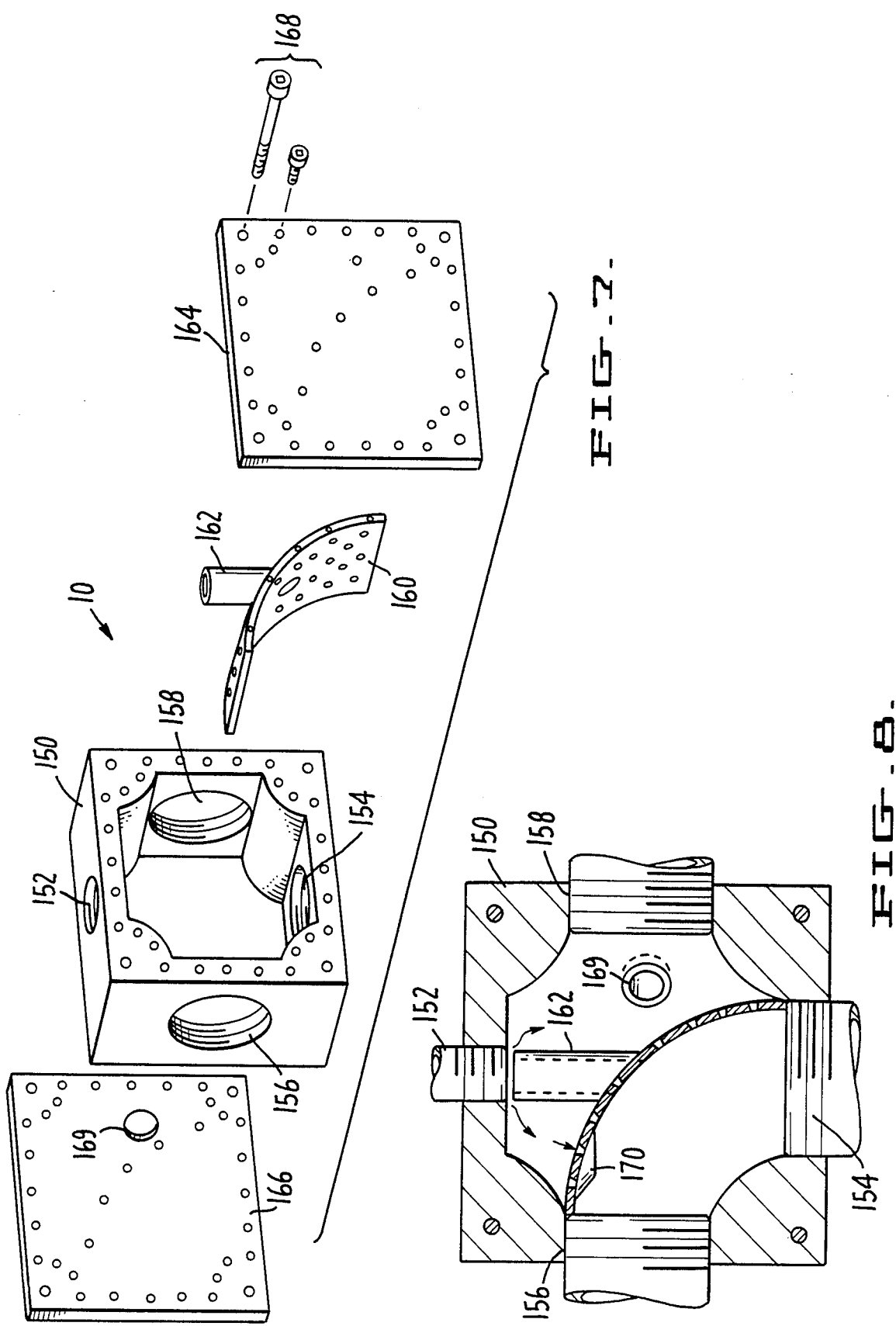

PUMP FILTER APPARATUS AND METHOD

TECHNICAL FIELD

This invention relates generally to fluid handling and fluid streams containing solids, and more particularly to apparatus and methods for simply removing the solids from the fluids, particularly on the intake side of an impeller driven centrifugal pump.

BACKGROUND OF THE INVENTION

Fluid handling is a vast field with applications in power generation, materials handling, the petrochemical industry, sewage, drinking water and many other fields too numerous to list. One vexing problem in almost all fluid handling applications involves pumping fluids which contain particles or solids. The most efficient type of pump for the displacement of fluids is the impeller driven centrifugal pump. The centrifugal pump is most efficient at converting the drive shaft motor power into useful work capable of displacing fluids. The centrifugal pump operates by the rotation of an impeller. The impeller is typically constructed of a malleable material capable of deforming under varying stress and capable of passing entrained particulate matter. One difficulty with impeller driven centrifugal pumps is that the impeller is easily torn to pieces by solid materials whose diameter approaches the impeller diameter. In industrial applications pump failure is routinely experienced at great cost in both production time and material costs, often requiring tedious decontaminations or isolations of hazardous materials. Other applications raise other safety concerns from pump failure.

The most direct approach to prevent pump failure due to the presence of solids in the impeller is to use a screen or filter to strain the particulate matter from the fluid intake side of the pump. This method suffers from a significant shortcoming since the accumulation of solids on the filter or screen creates a pressure drop resulting in the steady decay of pumping flow rates. Eventually the screen becomes so enmeshed with solids that fluid passes through so slowly as to starve the pump and result in another type of failure from burning the pump out. This approach to the problem therefore requires that the filter be periodically cleaned, at the expense of valuable production time, to insure adequate flow rates to the intake side of the pump. Parallel sets of filters are often installed to avoid downtime. This approach involves additional capital expense, particularly in industrial applications in refineries and power generation units.

Another approach has been to develop alternative pump designs which do not suffer from the impeller shearing problems described above. In many applications involving mining and dredging, piston type pumps have been developed to permit the transport of particle-rich fluids without damage to the pump hardware. These designs, while addressing the solid particle problems, are inefficient.

For the first time, the present invention provides an apparatus to remove solids from a fluid stream on the intake side of a centrifugal pump without solid buildup on the separating device and without the decaying pressure drop problems associated with classical filtration. The apparatus is constructed of standard pipe joint parts. It requires no active maintenance and is easy to install and operate. It is applicable to a wide range of applications from the chemical processing industry, to site construction excavations, municipal water supplies, to electrical power generation. The apparatus incorporates proven principles of pressure vessel design and requires no additional training to operate even in highly dangerous applications.

It is therefore an object of the present invention to provide an apparatus for the removal of solids from fluids on the intake side of a centrifugal pump.

It is a further object of the instant invention to provide a novel separating apparatus which is constructed of conventional pipe parts, or derived from conventional parts.

It is another object of this invention to provide solid/fluid separation without a gradual increase in the pressure drop across the separating medium.

It is a still further object of this invention to provide a novel separating apparatus which is easy to maintain and repair.

These and further objects of the instant invention will become readily apparent to those of ordinary skill in the art by reference to the instant specification and figures.

SUMMARY OF THE INVENTION

The present invention provides an apparatus for separating solid matter from a fluid which comprises a pipecross-like chamber having a main upper outlet, a main lower outlet, a horizontal, main fluid intake and a horizontal, pump-side fluid outlet; a perforated deflector/separator plate sealingly and angularly disposed within said pipecross-like chamber such that said pipecross-like chamber is separated into an upper chamber region and a lower chamber region, the upper chamber region bounded by the upper surface of said plate, said main upper outlet and said horizontal, pump-side outlet, and the lower chamber region bounded by the lower surface of said plate, said main lower outlet and said horizontal, main fluid intake, said deflector/separator plate further having at least one aperture therethrough for receiving at least one shear jet; at least one elongate shear jet, sealingly received within, and coaxially disposed along, said main upper outlet, one end of said shear jet passing through said main upper outlet and communicating externally of said upper chamber region, and the other jet end angularly fitted to, and received by, said deflector/separator upper surface such that said shear jet is sealingly received by said deflector/separator plate aperture; and, at least one backflush inlet through the walls of said pipecross-like upper chamber region for communication of fluid external of said upper chamber region towards said deflector/separator plate.

The instant invention also provides a method for removing particles and the like from fluids being fed to a centrifugal pump which comprises the steps of: providing an apparatus for separating solid matter from a fluid which comprises a pipecross-like chamber having a main upper outlet, a main lower outlet, a horizontal, main fluid intake and a horizontal, pump-side fluid outlet; a perforated deflector/separator plate sealingly and angularly disposed within said pipecross-like chamber such that said pipecross-like chamber is separated into an upper chamber region and a lower chamber region, the upper chamber region bounded by the upper surface of said plate, said main upper outlet and said horizontal, pump-side outlet, and the lower chamber region bounded by the lower surface of said plate, said main lower outlet and said horizontal, main fluid intake, said deflector/separator plate further having at least one aperture therethrough for receiving at least one shear jet; at least one elongate shear jet, sealingly received within, and coaxially disposed along, said main upper outlet, one end of said shear jet passing through said main upper outlet and communicating externally of said upper chamber region, and the other jet end angularly fitted to, and received by, said deflector/separator upper surface such that said shear jet is sealingly received by said deflector/separator plate aperture; and, at least one backflush inlet through the walls of said pipecross-like upper chamber region for communication of fluid external of said upper chamber region towards said deflector/separator plate; connecting a first fluid source to the horizontal, main fluid intake of the provided apparatus; connecting a centrifugal pump to the horizontal, pump-side fluid outlet of the provided apparatus; connecting a second fluid source to the apparatus provided shear jet, said second fluid source necessarily at a pressure greater than the fluid pressure extant in the pipecross-like chamber of the provided apparatus; connecting a third fluid source to the backflush inlet of the provided apparatus; and, providing means for transporting the separated matter away from the provided pipecross-like chamber main lower outlet.

BRIEF DESCRIPTION OF THE FIGURES

FIG. 4 is a flow diagram of the instant invention showing a particular application of the instant invention.

FIG. 5 is a detailed view of the backflush inlet of a preferred embodiment of the instant invention.

FIG. 6 is a detailed view of an alternate embodiment of the shear jet of the instant invention.

FIG. 7 is a perspective view of an alternate embodiment of the instant invention.

FIG. 8 is a partially broken away elevational view of an alternate embodiment of the instant invention.

DETAILED DESCRIPTION OF THE INVENTION

The present invention was designed with reference to an automotive parts washing apparatus in which a water/caustic wash fluid is used to clean automotive parts. The parts are often grease covered, resulting in a two-phase liquid system, additionally containing metal shavings, nuts, bolts and miscellaneous solid objects. Separation of the gross solid matter is desirable since the washing fluid is recycled. While reference in the specification is made to the specific application to which this device has already been successfully applied and demonstrated, it will be apparent to those of ordinary skill in the art that the instant invention has a myriad of applications, far beyond the specific application discussed in the working example below.

Figure 1:
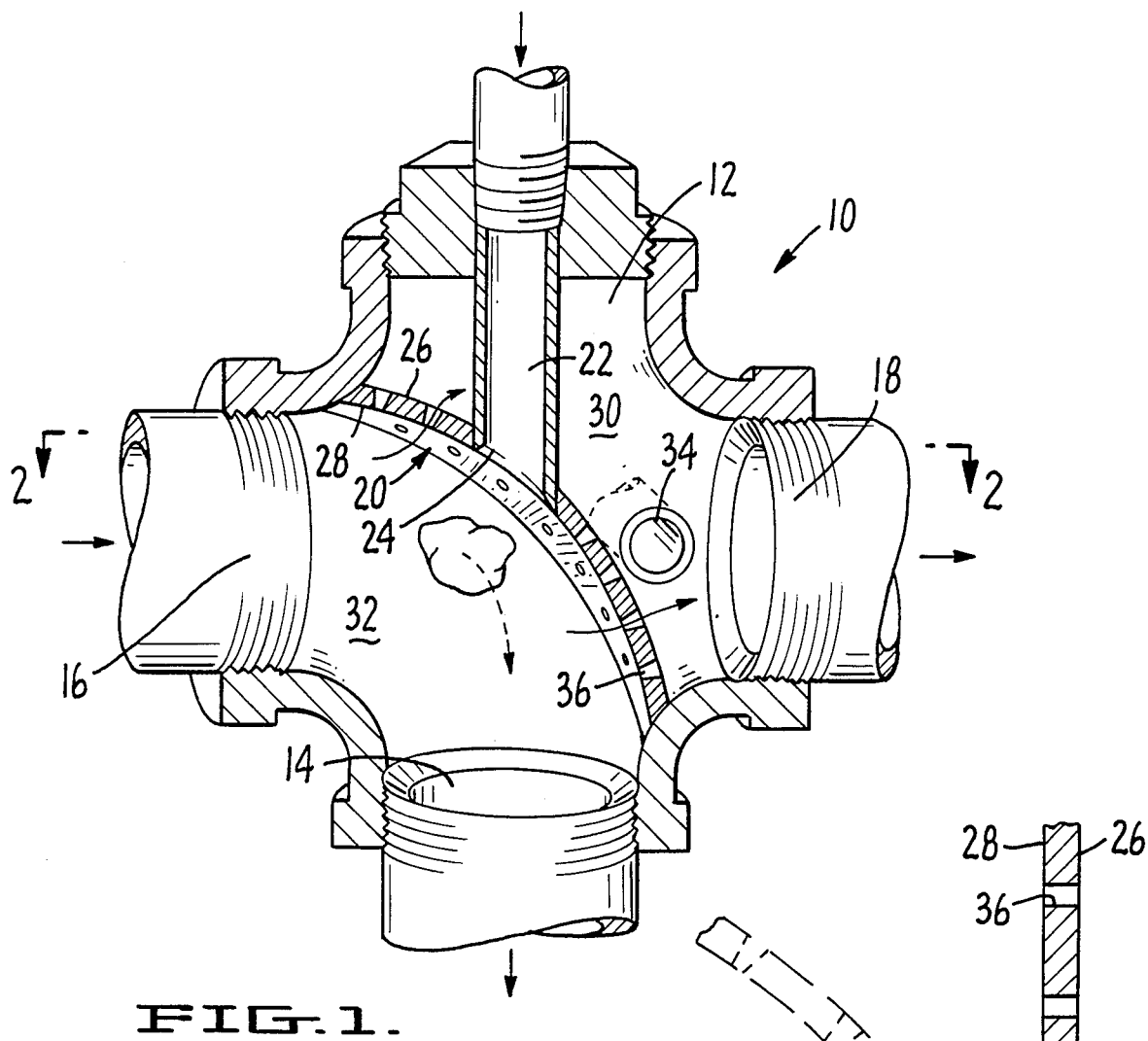
FIG. 1 is a front elevation partially broken away to show the chamber and deflector/separator plate of a preferred embodiment of the instant invention.

FIG. 1 is a partially broken away view of the apparatus of the instant invention. A separator 10, in this embodiment is constructed out of an ordinary pipecross. The separator 10 has a main upper outlet 12, a main lower outlet 14, a horizontal, main fluid intake 16 and a horizontal, pump-side fluid outlet 18. The minimum number of main ports into the separator is four and separators having more ports than the four described here are intended to be within the scope of the invention and the appended claims. Disposed within the separator 10 is a deflector/separator plate 20. In the presently preferred embodiment, plate 20 is curved, but it is intended that a flat plate angularly disposed within the separator 10 is within the scope of the instant invention. A more complete discussion of the characteristics and requirements of the plate 20 appears below, specifically with reference to FIGS. 3 and 7.

A shear jet 22 is also disposed within the separator 10. In this embodiment, the shear jet 22 is coaxially disposed within the main upper outlet 12, communicating externally of the separator 10. It is intended that the inner diameter of the shear jet 22 is less than the inner diameter of the main ports (12, 14, 16 and 18). This reduced diameter insures that the velocity of the fluid entering from the jet is typically higher than the velocity of fluid entering the separator from the horizontal, main fluid intake 16. The desirability of the increased velocity will be come more apparent below. The shear jet 22 terminates at the deflector/separator plate 20, being received within a jet aperture 24 through the body of the plate 20. Thus the shear jet 22 effluent enters the separator 10 below a plate upper surface 26. As described more fully below, variations of this shear jet embodiment are possible, such as the use of a plurality of jets disposed angularly within the main upper outlet. Also it is possible to provide the shear jet 22 in two longitudinal sections whereby one such section is permanently welded to the plate jet aperture 24. The other section of the jet 22 would be permanently fixed within the upper outlet 12. The connection between the two sections of the jet 22 need not be completely sealed, as slight leakage would provide a showering of fluid upon the plate upper surface 26. Additional disclosure of the relationship between the jet 22 and plate 20 is provided below with reference to the alternate embodiment shown in FIG. 7.

Referring to FIG. 1, it can be seen that the deflector/separator plate 20 divides the separator 10 into two regions. An upper chamber region 30 is bounded by the plate upper surface 26, the main upper outlet 12 and the horizontal, pump-side fluid outlet 18. A lower chamber region 32 is bounded by the plate lower surface 28, the main lower outlet 14 and the horizontal, main fluid intake 16. It is necessary that the plate 20 be sealingly received within the separator 10 such that fluid communicates from the lower region 32 to the upper region 30 only through the deflector/separator plate 20. In the presently preferred embodiment, wherein the deflector/separator plate is constructed of metal, traditional welding techniques are used to affix the plate 20 to the separator 10 inner walls. The weld is also extended to insure that the plate 20 is sealed against the inner wall. It is intended however that alternate materials of construction are within the scope of this invention. For example, polyvinylchloride pipes are used in many diverse applications. It is possible to construct a separator 10 and plate 20 from polyvinylchloride. In that application, chemical adhesives, for example epoxies and silicon caulking, could be used to sealingly fix the deflector/separator plate 20 within the separator 10.

A backflush inlet 34 is provided to communicate externally from the upper chamber region 30. Although described more fully below with reference to FIGS. 4 and 5, suffice it to say that the backflush inlet 34 is useful to forcibly eject any type of solid material which may accumulate on, in or near the plate perforations 36. A special valving arrangement and mode of operation are described below for the use of this backflush inlet 34. It is also noted that a plurality of backflush inlets may be provided in which multiple fluid jets are directed toward and impinged upon the plate perforations 36. Such multiple inlets could be ganged together by attachment to a manifold capable of distributing fluid to a series of inlets. The particular use environment will determine the need and desirability of a plurality of backflush inlets, such knowledge being within the ordinary skill of an artisan in this field.

Figure 2:
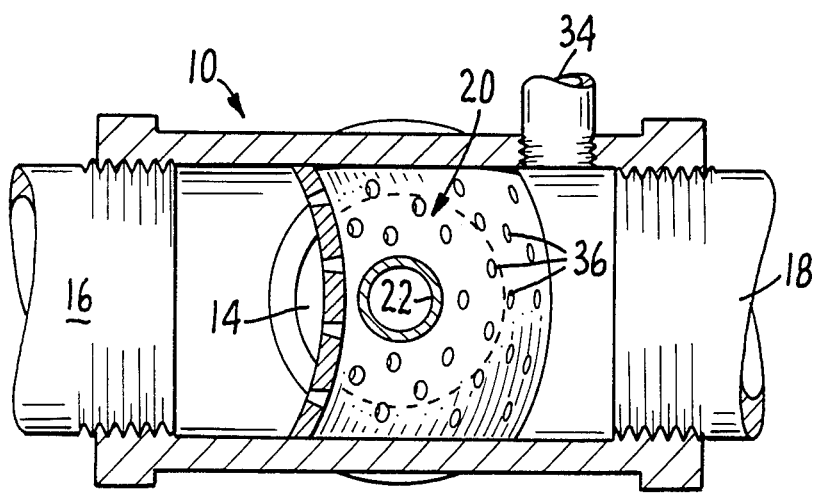
FIG. 2 is a cross sectional view taken along the line 2—2 in FIG. 1, showing the spatial relationship between the shear jet, deflector plate and the chamber inlets and outlets.

FIG. 2 shows a cross sectional view taken along the line 2—2 in FIG. 1. This view is intended to show the spatial relationship, in the preferred embodiment, of the main lower outlet 14, the shear jet 22 and the deflector/separator plate 20. In this particularly preferred embodiment, the shear jet 22 is concentric with the main lower outlet 14. In the embodiment wherein a plurality of shear jets is provided (see FIG. 6), it is intended that the jets all be disposed directly above the main lower outlet 14 to prevent the creation of any additional turbulence or backflow from the reflection of the fluid jet against the lower chamber region 32 wall.

It is also contemplated at this time that the use of a plurality of shear jets (as shown for example in FIG. 6) could potentially eliminate the need for the deflector plate at all, or could result in a greatly modified design of the plate. Additional research work is presently ongoing to test this principle and more completely define and characterize the crucial parameters. It is believed at this time that the shear caused by the higher velocity fluid entering the chamber interacts with the fluid and contained particles to drive the particles downwardly towards the main lower outlet 14.

Figure 3:
FIG. 3 is a cross sectional detail of the deflector/separator plate of a preferred embodiment of the instant invention, the curvature of the plate resulting in a change in the perforation profile as shown by the broken lines.

The fabrication of the deflector/separator plate 20 is shown in detail in FIG. 3. The below described method relates only to curved and metal plates. As noted above, a flat plate and PVC materials of construction are intended to be within the scope of this invention. The important characteristic resulting from this particular method of fabrication is that the perforations 36 through the plate 20 have a varied "pore diameter." As shown in broken lines in FIG. 3, the perforations in the lower surface of the plate 28 have a smaller diameter than the perforations on the upper plate surface 26. This perforation characteristic prevents solid particles from stubbornly lodging within the perforations since anything which passes through the smaller pore diameter must necessarily pass through the larger pore diameter extant on the plate upper surface 26. In the presently preferred embodiment, a flat plate 20 is perforated by known techniques, e.g. punching or drilling, and then the plate is rolled to add the curvature shown in the figure. This rolling step causes the plate to be elongated on the upper plate surface while compressing the lower plate surface. This force variation results in the pore diameter variation shown by the broken lines in FIG. 3.

A particularly preferred method of use of the separator apparatus is now described with reference to FIG. 4. In this application the preferred apparatus described above is shown in FIG. 4, but it will be apparent that other apparatus can be provided which are within the scope of the instant invention. An automatic automobile parts washer 40 is used to degrease and cleanse automobile parts 42. A liquid sprayer 44 is disposed within the washer 40 to inject a caustic soda wash onto the part 42. Wash fluid liquid 46 accumulates in the bottom of the washing apparatus 40. In this embodiment, a wash fluid recycle line 48 is provided to recycle the wash fluid to the sprayer 44. The wash fluid 46 which accumulates in the washer 40 contains particles and other solid materials, as well as emulsified oil and greases. In order to recycle the fluid from the bottom of the washer 40 to the sprayer 44, the fluid must pass through the recycle line 48 towards the pump intake 50 and pump 52.

As noted above one of the more vexing problems related to systems of this type is that solid particles entrained with the fluids are fed to the pump and thereby damaging to the pump impeller, often tearing the impeller and resultantly losing the seal required to effect the fluid transfer. To prevent the passage of solids from the washer bottom to the pump 52, the separator 10 is installed in the wash fluid recycle line 48 to separate the solids from the pump intake 50 to thereby prevent damage to the impeller in pump 52. The pump effluent is then directed back towards the sprayer 44. An isolation valve 54 is provided in the sprayer feed line 55 to close off the washer 40 from the pump 52 when required. A bleed line 56 is tapped off of the pump effluent/sprayer feed line 55 and connected to a backflush inlet line 58 which contains a backflush valve 60. The bleed line 56 is also connected to a shear jet line 62 and shear jet valve 64 before passing into the shear jet 22.

The result of this flow scheme is that solid particles 66 are directed toward, separated from and deflected away by the deflector/separator plate 20. The solid particles are maintained within the lower chamber region and pass out of the separator 10 through the main lower outlet 14. A return line 68 is connected to the main fluid outlet 14 to return wash fluid to the washer 40 through the screen box 70. The "filtered" wash fluid then passes into the upper chamber region 30, into the horizontal, pump-side fluid outlet 18 and through a reducer 72.

The configuration shown in FIG. 4 represents the steady state run mode of the instant method and apparatus. Note that the backflush valve 60 has the letter "C" alongside. This notation indicates that during the steady state operation of this apparatus, the backflush valve 60 is closed. Shear jet valve 64 however is open during this time to permit fluid at a higher pressure than on the intake side of the pump to pass into the separator 10 through the shear jet 22.

With reference to FIG. 5, the "backflushing" mode is shown in partial detail. In FIG. 5, the backflush valve 60 is open and the shear jet valve 62 is designated as closed. In this configuration the bleed line 56 is open to the pump effluent, causing the injection of higher pressure fluid toward and impinging upon the plate upper surface 26. This action permits the dislodgement of any entrapped particles or solids which may have become lodged in the plate perforations 36. A quick backflushing can be accomplished without long periods of shutdown in the pump operation.

FIG. 6 shows an alternative embodiment of the separator apparatus. Two variations from the particularly preferred embodiment merit attention. The first relates to the shear jet 122. In the preferred embodiment described with reference to FIG. 1, there was only a single shear jet. In this embodiment a single shear jet feed 122 is provided. Branching off from this single feed is a manifold 124 which feeds a plurality of shear jets 126a, 126b, 126c and 126d. As in the case of a single shear jet, the ends are sealingly fixed within apertures in the deflector/separator plate.

FIG. 6 also shows a variation on the backflush inlet described above with reference to FIG. 1. In particular, a plurality of backflush inlets 134a, 134b and 134c are provided. Each of these backflush inlets is connected to a manifold in turn connected to a backflush inlet line tapped into the pump bleed line. These multiple backwash jets permit more vigorous and localized backflushing to dislodge particles from the plate perforations.

FIG. 7 describes a separator 10 having a pipecross-like chamber 150 in which the sidewalls are removable. The above-described preferred embodiment utilized existing hardware. This embodiment represents a novel design specifically developed for this application. As with the conventional pipecross, this embodiment uses four major ports, a main upper outlet 152, a main lower outlet 154, a horizontal, main fluid intake 156 and a horizontal, pump-side intake 158. In this embodiment a removable deflector/separator plate 160 is provided for ease of installation and maintenance. It is also possible to provide a customer with series of plates having perforations of varied size and selected to fit the particular application required. A longitudinal sectional shear jet 162 comes preaffixed to the deflector/separator plate. The length of the longitudinal section is chosen to allow insertion and removal of the plate through the sidewall openings. Front plate 164 and rear plate 166 are shown in exploded view. They are to be bolted to the main pipecross-like chamber using bolts 168. Clearly the amount and strength of the bolts is dependent upon the operating pressure of the system to which it is applied. Rear plate 166 also has an orifice 169 which is used to act as a backflush inlet.

FIG. 8 shows a cross sectional view of the instant invention wherein two longitudinal sections are combined to form the shear jet 162. In this embodiment there is a slight gap between the lower section 162 and the upper section within the main upper outlet 152. This gap as shown in the figure permits fluid to leak out of the shear jet and disperse jets of fluid against the deflector/separator plate upper surface.

FIG. 8 also shows a baffle 170 attached to the lower surface of the plate. The baffle allows the deflection of large particles directly toward the lower fluid outlet. This baffle 170 is preferably located on between the fluid intake and the shear jet. The baffle is useful in the particularly preferred embodiment of FIG. 1 and can be attached to the plate by conventional welding techniques.

Having described the invention with respect to preferred embodiments, it is apparent that there are other embodiments and examples which are within the scope of the appended claims. For example, it is possible to hook together a series of these devices having plate perforations of diminishing size. This could enable ultrafiltration without pressure drop problems. It is also suggested that the perforation diameter be selected in light of the impeller diameter. It is a safe working assumption that particles whose size permits them to pass through the impeller will not damage the impeller. Therefore, one criteria for selecting pore diameter should include the pump impeller diameter.

It is also noteworthy that while the instant invention has been described with reference to being a pump filtration device it can be used without a pump.

With respect to the shear jet and the backflush inlet, while the preferred embodiment has been described with reference to using a pump bleed line, it will be apparent to ordinary artisans that other sources may be used for these fluid inlets. For example, it is possible to use the instant apparatus as a mixing chamber by utilizing the shear jet to introduce a second fluid. The backflush inlet may also be connected to a separate fluid source, not the pump bleed nor the shear jet fluid source.

EXAMPLE

In an apparatus similar to the one described in FIG. 4, a 3 HP, 3 phase Ingersoll-Rand pump was installed. The pump is characterized by high volume low pressure operation. It is estimated that the pump has a 150 gpm capacity. The pump inlet is 1¼ inches with an outlet of 1 inch. A standard off the shelf 1¼ inch pipecross was used to fabricate the separator according to the procedures described above. A ⅜ inch tube was used for the shear jet. After eighteen hours of continuous run time attached to the automobile parts washer there has been no degeneration in the measured flow rate and no pump damage despite the presence of solids.

In selecting the size of the separator chamber, it is suggested that the pipecross-like chamber be of a larger diameter than the intake line. This extra volume acts as a reservoir slowing the fluid velocity and making the separation of the solids easier. It is also useful to neck down the outlet side of the separator as it feeds the pump. This insures that the pump will not be starved when, for example, the shear jet is valved off and the backflush is momentarily turned on. It is also suggested that the separator be installed at a distance upstream of the pump. This volume also acts as a reservoir of fluid so that momentary flow changes will not adversely affect pump performance.

The deflector plate should also be designed to be of sufficient strength since the solids entrained in the liquids could impart significant momentum to the plate upon impact. Solid particle size and fluid velocity must be accounted for in choosing plate thickness.

I claim:

1. An apparatus for separating solid matter from a fluid which comprises:
    (a) a pipecross chamber having a main upper outlet, a main lower outlet, a horizontal, main fluid intake and a horizontal, pump-side fluid outlet;
    (b) a perforated deflector/separator plate sealingly and angularly disposed within said pipecross chamber such that said pipecross chamber is separated into an upper chamber region and a lower chamber region, the upper chamber region bounded by the upper surface of said plate, said main upper outlet and said horizontal, pump-side outlet, and the lower chamber region bounded by the lower surface of said plate, said main lower outlet and said horizontal, main fluid intake, said deflector/separator plate further having means defining at least one aperture therethrough for receiving at least one means defining a shear jet;
    (c) at least one means defining an elongate shear jet, sealingly received within, and coaxially disposed along, said main upper outlet, one end of said shear jet defining means passing through said main upper outlet and communicating externally of said upper chamber region, and the other end of the shear jet defining means angularly fitted to, and received by, said deflector/separator upper surface such that said shear jet defining means is sealingly received by said deflector/separator plate aperture; and, (d) at least one backflush inlet through the walls of said pipecross upper chamber region for communication of fluid external of said upper chamber region towards said deflector/separator plate.

2. The apparatus of claim 1 wherein said deflector/separator plate is curved in at least one plane, the inner plate curvature facing the lower chamber region.

3. The apparatus of claim 1 wherein a deflector baffle is positioned within the lower chamber region on the lower surface of the deflector/separator plate between the main fluid intake and the means defining said aperture through said deflector/separator plate.

4. The apparatus of claim 1 wherein a selectively removable face plate is provided within the pipecross chamber to permit the installation, cleaning and removal of the deflector/separator plate contained within the chamber, said removable face plate being removably fastened to said chamber body by bolts.

5. The apparatus of claim 1 wherein a plurality of backflush inlets are connected to a single manifold to permit multiple fluid jet defining means within said chamber to be directed toward, spaced apart from and fluid impinged upon the upper surface of the deflector/separator plate to thereby dislodge any particulate matter which may have become lodged on or within the means defining the plate aperture.

6. The apparatus of claim 1 wherein said elongate shear jet defining means comes in at least two longitudinal sections, the first of said sections being affixed to, and received within, the means defining the deflector/separator plate aperture and the other section of the jet defining means being fixed within the upper outlet whereby the jet defining means becomes substantially continuous along its length when the two sections are placed together.

7. The apparatus of claim 1 wherein the means defining at least one aperture through said deflector/separator plate have a smaller diameter on the lower plate surface than on the upper plate surface.

8. A combination comprising the apparatus of claim 1 and a centrifugal pump connected to the horizontal pump-side fluid outlet of the pipecross chamber.

9. A method for removing particles and the like from fluids being fed to a centrifugal pump which comprises the steps of:

(a) providing an apparatus for separating solid matter from a fluid which comprises a pipecross chamber having a main upper outlet, a main lower outlet, a horizontal, main fluid intake and a horizontal, pump-side fluid outlet; a perforated deflector/separator plate sealingly and angularly disposed within said pipecross chamber such that said pipecross chamber is separated into an upper chamber region and a lower chamber region, the upper chamber region bounded by the upper surface of said plate, said main upper outlet and said horizontal, pump-side outlet, and the lower chamber region bounded by the lower surface of said plate, said main lower outlet and said horizontal, main fluid intake, said deflector/separator plate further having at least one aperture therethrough for receiving at least one shear jet; at least one elongate shear jet, sealingly received within, and coaxially disposed along, said main upper outlet, one end of said shear jet passing through said main upper outlet and communicating externally of said upper chamber region, and the other jet end angularly fitted to, and received by, said deflector/separator upper surface such that said shear jet is sealingly received by said deflector/separator plate aperture; and, at least one backflush inlet through the walls of said pipecross upper chamber region for communication of fluid external of said upper chamber region towards said deflector/separator plate;

(b) connecting a first fluid source to the horizontal, main fluid intake of the apparatus provided in step (a);

(c) connecting a centrifugal pump to the horizontal, pump-side fluid outlet of the apparatus provided in step (a);

(d) connecting a second fluid source to the shear jet provided in step (a), said second fluid source necessarily at a pressure greater than the fluid pressure extant in the pipecross chamber of the apparatus of step (a);

(e) connecting a third fluid source to the backflush inlet of the apparatus provided in step (a); and, (f) providing means for transporting the separated matter away from the pipecross chamber main lower outlet provided in step (a).

10. The method of claim 9 wherein said deflector/separator plate is formed by first perforating a substantially flat plate and thereafter bending said plate to elongate the diameter of the upper surface perforations.

11. The method of claim 9 wherein said second fluid source connected to the shear jet is a bleed line from the centrifugal pump outlet.

12. The method of claim 9 wherein said separated matter transport means comprises a fluid line connected to the main lower outlet which thereafter empties into a liquid catch basin discharging fluid into said basin below the surface of therein contained liquid, said catch basin further communicating with a fluid recycle line which is connected at its other end to the first fluid source.

13. The method of claim 9 wherein said third fluid source connected to the backflush inlet is a bleed line from the centrifugal pump outlet.

* * * * *